(12) United States Patent
Sakaguchi (10) Patent No.: US 6,725,652 B2
(45) Date of Patent: Apr. 27, 2004

(54) DIESEL PARTICULATE FILTERING DEVICE

(75) Inventor: Toshiaki Sakaguchi, Fujisawa (JP)

(73) Assignee: Isuzu Motors LTD., Tokyo (JP)

( * ) Notice: Subject to any disclaimer, the term of this patent is extended or adjusted under 35 U.S.C. 154(b) by 271 days.

(21) Appl. No.: 09/879,116

(22) Filed: Jun. 13, 2001

(65) Prior Publication Data

US 2002/0038545 A1 Apr. 4, 2002

(30) Foreign Application Priority Data

Oct. 3, 2000 (JP) ........................................ 2000-304012
Mar. 30, 2001 (JP) ........................................ 2001-098100

(51) Int. Cl.[7] .............................................. F01N 3/00
(52) U.S. Cl. .............................. 60/297; 60/295; 60/311; 60/292; 55/DIG. 30
(58) Field of Search .......................... 60/295, 297, 311, 60/285, 287, 291, 292, 303; 55/DIG. 30

(56) References Cited

U.S. PATENT DOCUMENTS

| | | | | |
|---|---|---|---|---|
| 4,719,751 A | * | 1/1988 | Kume et al. ................... | 60/285 |
| 4,934,142 A | * | 6/1990 | Hayashi et al. ................ | 60/297 |
| 5,063,736 A | * | 11/1991 | Hough et al. .................. | 60/286 |
| 5,357,755 A | * | 10/1994 | Gillingham et al. .......... | 60/288 |
| 5,489,319 A | * | 2/1996 | Tokuda et al. ................. | 55/213 |
| 5,655,366 A | * | 8/1997 | Kawamura .................... | 60/286 |
| 5,716,586 A | * | 2/1998 | Taniguchi .................... | 422/173 |
| 6,090,187 A | * | 7/2000 | Kumagai ....................... | 95/278 |
| 6,304,815 B1 | * | 10/2001 | Moraal et al. ............... | 701/115 |
| 6,405,528 B1 | * | 6/2002 | Christen et al. .............. | 60/295 |

* cited by examiner

*Primary Examiner*—Binh Tran
(74) *Attorney, Agent, or Firm*—Staas & Halsey LLP (57) ABSTRACT

In a diesel particulate filtering device 1A, 1B which is provided with a diesel particulate filter units 10, 20, 30 for cleaning exhaust gas, and in which cleaning of the exhaust gas and the recovery thereof are performed, diesel particulate filter controllers 60, 62 for determining a recovery time based on detected values PI, PO0, PO1, PO2 of exhaust pressure sensors 51 to 55 in an upstream side of said diesel particulate filter units 10, 20, 30 and a downstream side thereof are provided with determination-value update means 60a, 62a resetting determination values R0, R1, R2 for determining a recovery time by comparing the detected values, PO0, PO1, PO2 with a standard exhaust pressure value P0. According to this constitution, the determination values R0, R1, R2 for determining the recovery time can be corrected simply by using determination-value update means 60a, 62a without changing contents of a control program when mounting it on a motor vehicle and coping with variations in output of the pressure sensors 51 to 55 due to time aging and so forth.

7 Claims, 6 Drawing Sheets

DIESEL PARTICULATE FILTERING DEVICE

BACKGROUND OF THE INVENTION

This invention relates to a diesel particulate filtering device trapping a particulate matter (PM) in exhaust gas of an internal combustion engine such as a diesel engine.

More particularly, this invention relates to a technology detecting clogging of this diesel particulate filtering device to incinerate the trapped PM and to recovery the filtering device.

The Harmful PM (particulate matter) is contained in exhaust gas emitted from the diesel engine in car use. It has been attempted that an exhaust pipe is provided with the diesel particulate filtering device constituted by a diesel particulate filter unit having a filter formed nonwoven fabric or the like made of a ceramics textile in order to clean these PM.

This diesel particulate filtering device is constituted by providing a singular or a plurality of diesel particulate filter units.

In the diesel particulate filtering device provided with the singular diesel particulate filter unit, PM in the exhaust gas is trapped by the diesel particulate filter unit. And then, when the filter of the diesel particulate filter unit is clogged up with this trapped PM, the diesel particulate filter unit is recovered.

Moreover, in the diesel particulate filtering device provided with a plurality of diesel particulate filter units, one diesel particulate filter unit traps PM in the exhaust gas to switch the exhaust gas passage when the filter of this diesel particulate filter unit is clogged up with this trapped PM. Moreover, the clogged diesel particulate filter unit is treated to recovered, while PM is trapped in succession by the other diesel particulate filter unit.

In this treatment for recovery, PM trapped by the filter is burnt and treated by a heating source such as an electric heater provided on the diesel particulate filter unit and to solve clogging.

In prior art, determination of a timing for recovery of the diesel particulate filter unit has been performed by comparing a difference in pressure or a ratio of pressure between the front and the back of the diesel particulate filter unit with a predetermined determination value, thereby to be designed to control such that the treatment for recovery is performed, when this difference in pressure or ratio of pressure exceeds the predetermined-determination value. This difference in pressure or ratio of pressure is obtained by measuring an exhaust pressure by exhaust pressure sensors provided on the front and the back of the diesel particulate filter unit.

The determination value for determination should be changed in response to a running condition of the engine, since the exhaust pressure is changed in accordance with changes in a speed of revolution and a read of the engine or the like when defining this difference in pressure as a criterion of determination. Therefore, control becomes complicated.

Moreover, the ratio of pressure at clogging becomes approximately constant, since the ratio of pressure is changed in response to the running condition of the engine in a small amount when defining the ratio of pressure as a criterion of determination. Therefore, the determination value for determination should not be changed in response to a running condition of the engine. As a result, control becomes relatively simple.

However, it is frequent the case where it is installed on commercial vehicles such as a truck in the case of a diesel engine which the diesel particulate filtering device is required. This commercial vehicle has been diversified in the exhaust characteristic, since an exhaust pipe with a different shape is provided depending upon the purpose of using a vehicle.

Therefore, the determination value determining for an initiating timing of the treatment for recovery should be adjusted every each vehicle, since the exhaust pressure of the outlet side of the diesel particulate filtering device is changed in response to the shape of the exhaust pipe even though providing the diesel particulate filtering device with the same size.

Furthermore, there also are variations to some degree in characteristics in the pressure sensor detecting the exhaust pressure. Output of the pressure sensor is changed due to time aging, in particular. Therefore, the determination value should be re-adjusted. However, there have been problems that determination of the presence or absence of necessity of re-adjustment of the determination value and re-adjustment of the determination take time, since the degree of this time aging is different depending upon each motor vehicle.

Still more, an initial adjustment of this determination value is performed by replacing the predetermined determination value stored in advance in a diesel particulate filter controller (controller) with the determination value determined renewedly by calculating to a shape of these exhaust pipes in the prior art. Accordingly, there have been the problems that rewrite operation becomes complicated and a rewrite operator should have expert knowledge on programming.

SUMMARY OF THE INVENTION

This invention is devised for solving the prior problems mentioned above, and the object of the invention is to provide a diesel particulate filtering device in which the determination value for determining the recovery time can be corrected simply by determination-value update means without changing contents of the control program when mounting the diesel particulate filtering device on the motor vehicle and coping with variations in output of the pressure sensor due to time aging and so forth.

The diesel particulate filtering device provided with the singular diesel particulate filter unit for accomplishing the object described above is constituted as follows.

A diesel particulate filtering device which is provided with the diesel particulate filter unit for cleaning the exhaust gas of an internal combustion engine, and in which cleaning of the exhaust gas by the diesel particulate filter unit and recovery of the diesel particulate filter unit clogged up with this cleaning of the exhaust gas are performed, wherein an exhaust pressure sensor provided on a downstream side of the diesel particulate filter unit and a diesel particulate filter controller for inputting a detected value of the exhaust pressure sensor to determine a recovery time of the diesel particulate filter unit are provided, as well as determination-value update means in which the diesel particulate filter controller compares the detected value of the exhaust pressure sensor with a predetermined-standard exhaust pressure value set and stored in advance to reset a determination value for determining the recovery time is provided.

Moreover, a diesel particulate filtering device provided with a plurality of diesel particulate filter units for accomplishing the object described above is constituted as follows.

A diesel particulate filtering device which is provided with a plurality of diesel particulate filter units for cleaning the exhaust gas of an internal combustion engine, and in which cleaning of the exhaust gas by the diesel particulate filter unit and recovery of the diesel particulate filter unit clogged up with this cleaning of the exhaust gas are performed alternately while switching an inflow passage of the exhaust gas to the diesel particulate filter unit, wherein exhaust pressure sensors provided on an upstream side and a downstream side of the diesel particulate filter unit respectively and a diesel particulate filter controller for inputting detected values of the exhaust pressure sensors to determine a recovery time of the diesel particulate filter unit and to control so as to switch the inflow passage of the exhaust gas to the diesel particulate filter unit are provided, as well as determination-value update means in which the diesel particulate filter controller compares the detected value of the exhaust pressure sensor with a predetermined-standard exhaust pressure value set and stored in advance to reset a determination value for determining the recovery time is provided.

According to this constitution, the predetermined determination value stored in advance in the diesel particulate filter controller can be reset simply based on a measured value of an actual exhaust pressure. It has become unnecessary to calculate the determination value for update to the shape of the exhaust pipe different every each vehicle renewedly and to rewrite contents in memory for the determination value. Therefore, installing operation of the diesel particulate filter unit controller can be simplified. Still more, the expert knowledge on programming becomes unnecessary to the operator, since determination-value update means automatically initiates update operation when being started.

Moreover, since the determination value is updated in accordance with the measured value of the actual exhaust pressure, it can be obtained more correctly than the case to obtain by calculating from the shape of the exhaust pipe, whereby the determination value can be set more reasonably.

Moreover, in the diesel particulate filtering device, the determination values for determining the recovery time are defined as the determination values relating to a ratio between the exhaust pressure value of the upstream side and the exhaust pressure values of the downstream side of said diesel particulate filter units, and the determination values to be reset are defined as a value obtained by multiplying the standard determination value by the predetermined-standard exhaust pressure value of the downstream side, as well as dividing it by the measured exhaust pressure values of the downstream side.

Namely, the determination value to be reset is defined by a formula;

Determination Value to be Reset=(Standard Determination Value)×(Standard Exhaust Pressure Value of Downstream Side)/(Actually-Measured Exhaust Pressure Value of Downstream Side).

A fluctuation from the standard value is corrected and can be stored as a new determination value by providing with this determination-value update means. Therefore, the pressure ratio for determining in the case where the diesel particulate filter is clogged is set simply.

Moreover, the ratio between the upstream-side exhaust pressure value and the downstream-side exhaust pressure value of the diesel particulate filter unit is hard to be affected by the speed of revolution and the read of the engine, and becomes approximately constant value to the clogged condition, whereby the recovery time can be determined simply by using this pressure ratio for determination of the recovery time.

In the diesel particulate filtering device, the determination-value update means are started through an external signal.

According to this constitution, the update has come to be able to perform simply by inputting this external signal from an external switch or the like. Moreover, the diesel particulate filtering device can be provided with a correcting function for reduction in output of the exhaust pressure sensor due to time aging.

Moreover, the more reasonable determination value can be set simply by inputting this signal, even in the case where output of the exhaust pressure sensor is changed due to time aging except for the case where mounting on the vehicle.

The recovery time can be determined appropriately according to the diesel particulate filtering device of these constitution, whereby the vehicle on which this diesel particulate filtering device is mounted can be improved in quality.

DETAILED DESCRIPTION OF THE INVENTION

A diesel particulate filtering (a diesel particulate filter) device of an embodiment according to the invention will be described with reference to drawings below.

First, a first embodiment will be described with reference to FIG. 1, FIG. 2 and FIG. 7.

Figure 1:
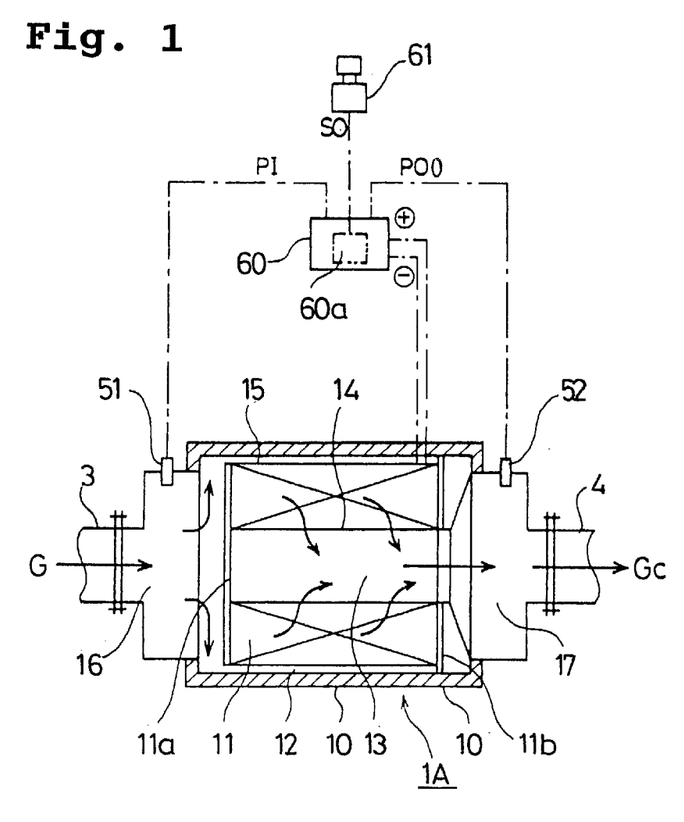
FIG. 1 is a view showing a detail block diagram of a diesel particulate filtering device of a first embodiment according to the invention, the view showing that PM is being trapped by a diesel particulate filter unit.

As shown in FIG. 1, this diesel particulate filtering device 1A is constituted by a singular diesel particulate filter unit 10 arranged in the front and the back directions of a vehicle. This diesel particulate filtering device 1A is constituted such that the diesel particulate filter unit 10 traps particulate matter (PM) in exhaust gas G.

Figure 7:
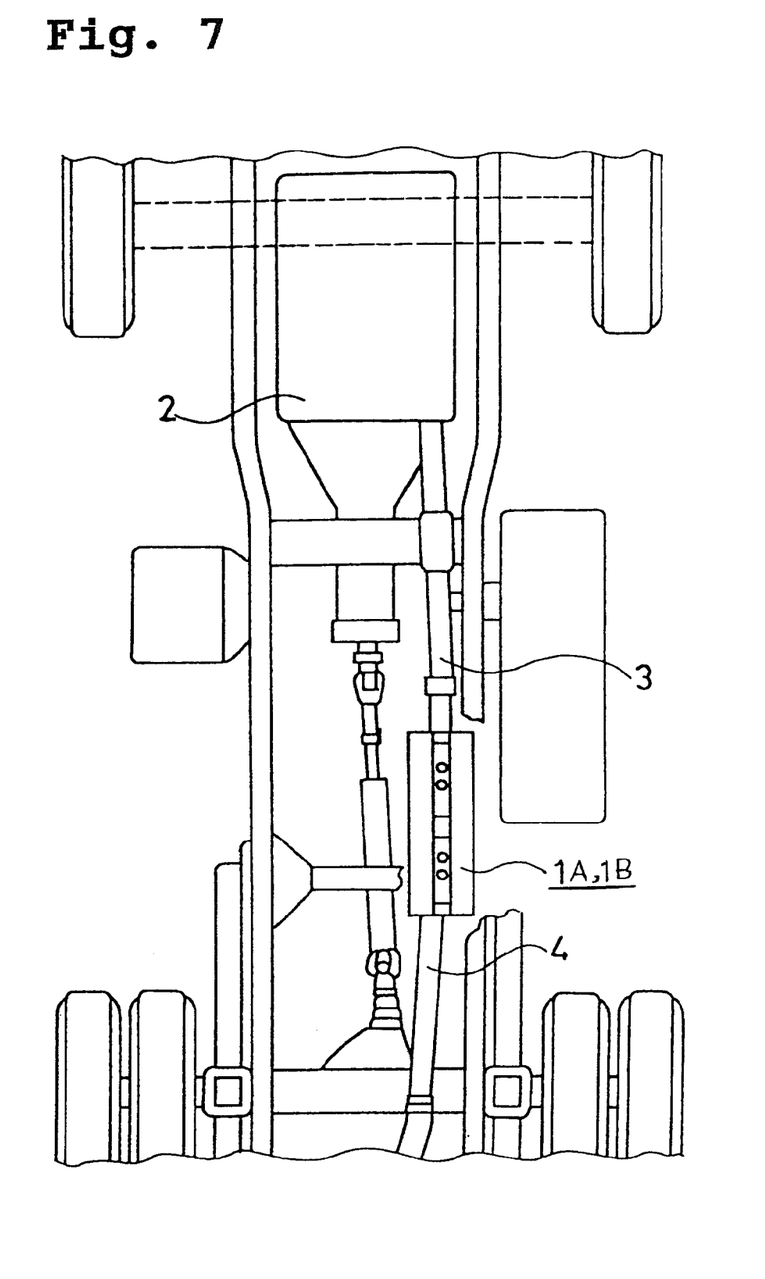
FIG. 7 is a view showing a condition that the diesel particulate filtering device of the embodiment according to the invention is mounted on a vehicle, the view viewing the vehicle from underneath.

Moreover, it is arranged in the course of an exhaust gas passage of an engine 2 mounted on the vehicle, that is, between an exhaust pipe 3 and an exhaust pipe 4 as shown in FIG. 7.

The exhaust gas G flow into the diesel particulate filter unit 10 from an exhaust gas passage 16 of the inlet side to be connected to the exhaust pipe 3 as shown in FIG. 1.

The exhaust gas G passes through the filter body 11 from an outside passage 12 of the filter body 11, PM is trapped by this filter body 11, and the exhaust gas become cleaned exhaust gas Gc when the exhaust gas G passes through the diesel particulate filter unit 10 (the case of FIG. 1). This cleaned exhaust gas Gc is discharged to the exhaust pipe 4 from an inside passage 13 by way of an outlet 17.

The filter body 11 of this diesel particulate filter unit 10 is formed into a hollow cylinder in a manner to be sandwiched and held by wire meshes 14 and 15 which nonwoven fabric made of a ceramics textile is arranged on the inner peripheral surface and the outer peripheral surface. An end 11a of the inlet side of this hollow cylinder is closed. The outside passage 12 which is the inflow-side passage for the exhaust gas G is formed between a case 10a and the outside of this filter body 11. A hollow portion 13 of the hollow cylinder provides the inside passage 13 which is the outlet-side passage for the exhaust gas Gc cleaned by the filter body 11. The outlet side of the filter body 11 is closed by a central opening end plate 11b with exception of the inside passage 13 of the hollow portion.

According to this constitution, the exhaust gas G would pass through within the filter body 11 from the outside passage 12 to flow out to the inside passage 13. As a result, PM in the exhaust gas G is trapped when passing through within the filter body 11.

Moreover, the filter body 11 is provided with a heater 15 for heating PM. This heater may include the wire mesh 15 of the outer peripheral surface in FIG. 1, arranged on the inner peripheral surface and the outer peripheral surface of the filter body 11. The filter body 11 is heated by feeding a current through the heater 15. Thus, the numeral '15' will be used in connection with both the heater and the wire mesh.

Moreover, a diesel particulate filter controller 60 for determining the recovery time is provided. Moreover, an upstream-side (inlet side) exhaust pressure sensor 51 is arranged on the upstream side of the filter body 11 and a downstream-side (outlet side) exhaust pressure sensor 52 is arranged on the outlet side of the diesel particulate filter unit 10. These detected values PI and POO of each sensor are input into the diesel particulate filter controller 60.

This diesel particulate filter controller 60 determines that clogging of the filter body 11 of the diesel particulate filter unit 10 becomes large, so that the treatment for recovery is required when a pressure ratio (=POO/PI) of the downstream-side exhaust pressure value POO versus the upstream-side exhaust pressure value PI becomes larger than the determination value R0 set in advance. Subsequently, the filter body 11 is heated by feeding a current through the heater 15 of the diesel particulate filter unit 10 based on this determination and PM trapped in the filter body 11 is burnt by this heating, thereby to be recovered.

Furthermore, in the invention, the diesel particulate filter controller 60 is provided with a reset button 61 capable of generating external signals SO, whereby a determination-value update means 60a of the diesel particulate filter controller 60 is arranged to be able to start by the external signals SO of the reset button 61.

Secondly, this determination-value update means 60a will be described. This determination-value update means 60a is means for setting and changing the determination value R0 for determinating the recovery time of the filter body 11 using the diesel particulate filter controller 60. This "determination-value update means" 60a is constituted by the "program for changing a determination value" of which flowchart is illustrated in FIG. 2. This "program for changing a determination value" is invoked from main control program of the diesel particulate filter controller 60 when inputting the external signals SO of the reset button 61.

When setting the determination value R0 at mounting the diesel particulate filtering device 1A on the vehicle and when a mechanic and other of the vehicle judges that changes in output of the exhaust pressure sensors 51 and 52 due to time aging have become large, the mechanic and other pushes the reset button 61, thereby this determination-value update means 60a to be started.

Figure 2:
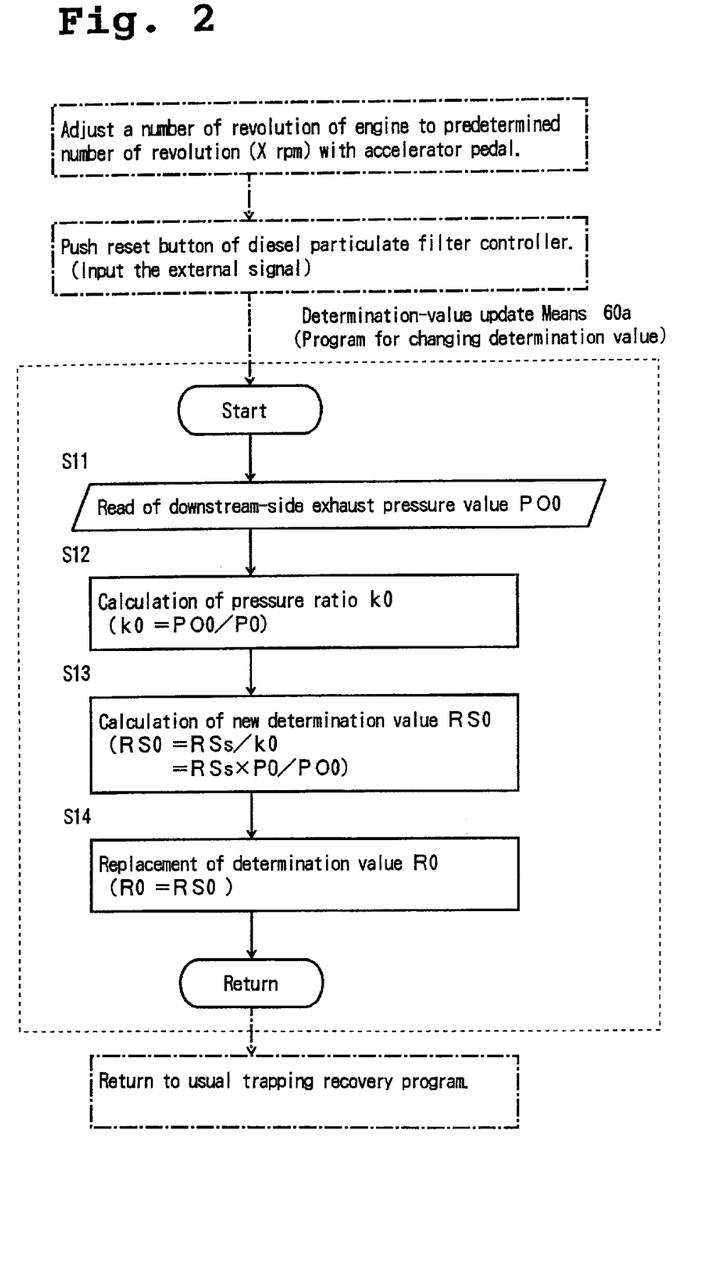
FIG. 2 is a flowchart of a "program for changing a determination value" of a determination-value update means of the diesel particulate filtering device of the first embodiment.

Namely, first, the mechanic and other operates an accelerator to adjust a number of revolution of the engine to a predetermined number of revolution X rpm (for example, a speed of revolution generating a maximum output: the reason is that the maximum output is not generated because of idling, but gentle characteristics can be obtained, since engine control systems such as EGR does not function at a maximum output point usually) as shown in FIG. 2. Under this condition, the mechanic and other pushes the reset button 61 of the diesel particulate filter controller 60. According to this operation, the "program for changing the determination value" 60a which is the determination-value update means is started.

The downstream-side exhaust pressure value POO of the diesel particulate filter unit 10 is red at step S11, when this "program for changing the determination value" 60a is started as shown in FIG. 2.

The downstream-side exhaust pressure value POO of this red-diesel particulate filter unit 10, an initialized-downstream-side exhaust pressure value P0 and a pressure ratio k0 (=POO/P0) are calculated at step S12. At subsequent step S13, a new determination value RS0 (=RSs/k0=RSs× P0/POO) are calculated from this pressure ratio k0 and an initialized-reference the determination value RSs. Subsequently, the determination value R0 is replaced with the new determination value RS0 at step S14.

Terminating a series of flow of this "program for changing a determination value" 60a, return instruction is performed to return to an usual diesel-particulate filter running management program and to continue the running.

In the case that the purpose is only starting of this "program for changing a determination value" 60a, the engine is stopped when the determination value change operation is terminated. In the case that there are other operations, the operation is continued without stopping the engine and to stop the engine when the operation is terminated.

According to the diesel particulate filtering device 1A described above, the following effects can be performed.

The fluctuation from the reference value for determination RSs is corrected and the new determination value RS0 is stored as the determination value R0 using the downstream-side standard exhaust pressure value P0 of the diesel particulate filter unit 10 set and stored in the diesel particulate filter controller 60 in advance and the measured value POO of the exhaust pressure value of the downstream-side, whereby the pressure-ratio determination value R0 for clogging can be reset simply.

Moreover, the "program for changing the determination value" 60a is started by the external signals SO, whereby the determination value R0 can be reset at appropriate time.

Subsequently, a second embodiment will be described with reference to FIG. 3 to FIG. 7.

Figure 3:
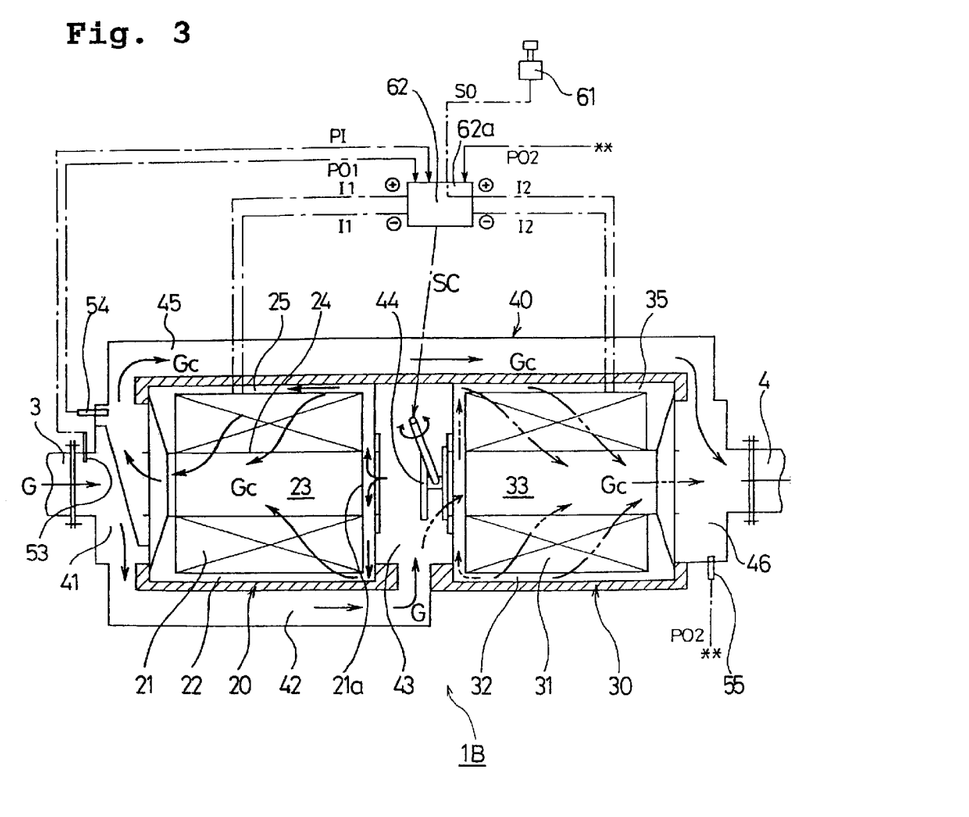
FIG. 3 is a view showing a detail block diagram of a diesel particulate filtering device of a second embodiment according to the invention, the view showing that PM is being trapped by a first diesel particulate filter unit.

As shown in FIG. 3, this diesel particulate filtering device 1B is constituted by a first diesel particulate filter unit 20 and a second diesel particulate filter unit 30 arranged in the front and the back directions of a vehicle. The diesel particulate filtering device 1B is constituted such that these first diesel particulate filter unit 20 and second diesel particulate filter unit 30 the diesel particulate filter unit 10 trap particulate (PM) in exhaust gas G. This diesel particulate filtering device 1B is arranged in the course of the exhaust gas passage, that is, between the exhaust pipe 3 and the exhaust pipe 4 as shown in FIG. 7, as is the first embodiment.

Figure 5:
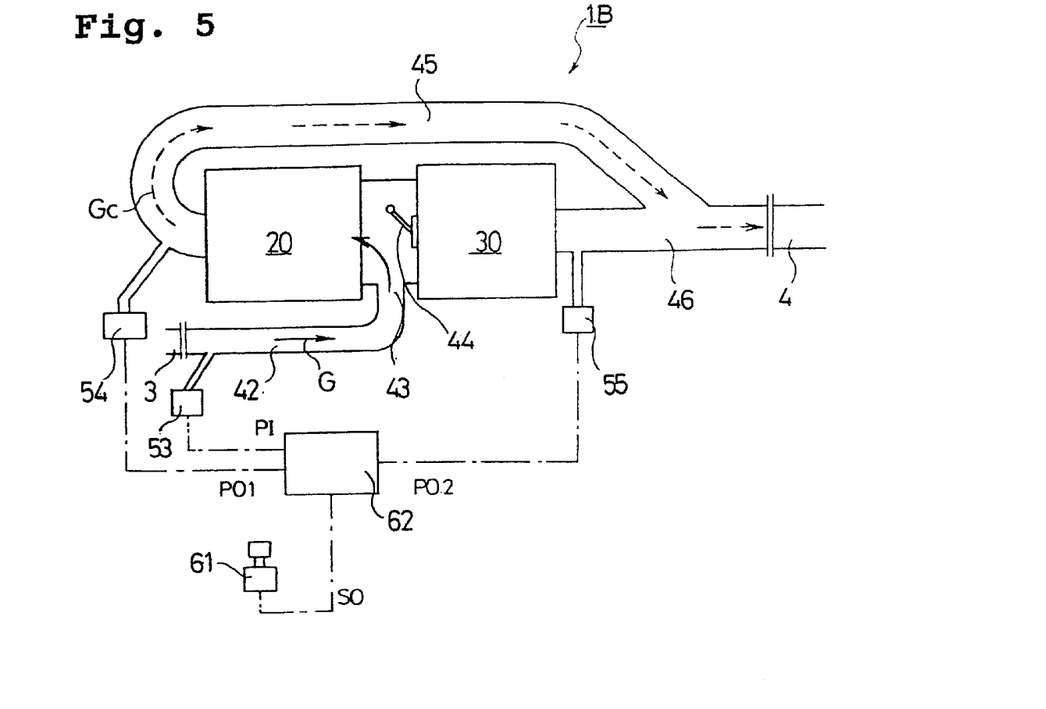
FIG. 5 is a schematic view showing a stream of exhaust gas within the diesel particulate filtering device of the second embodiment, the view showing that a first diesel particulate filter unit is trapping PM.
Figure 6:
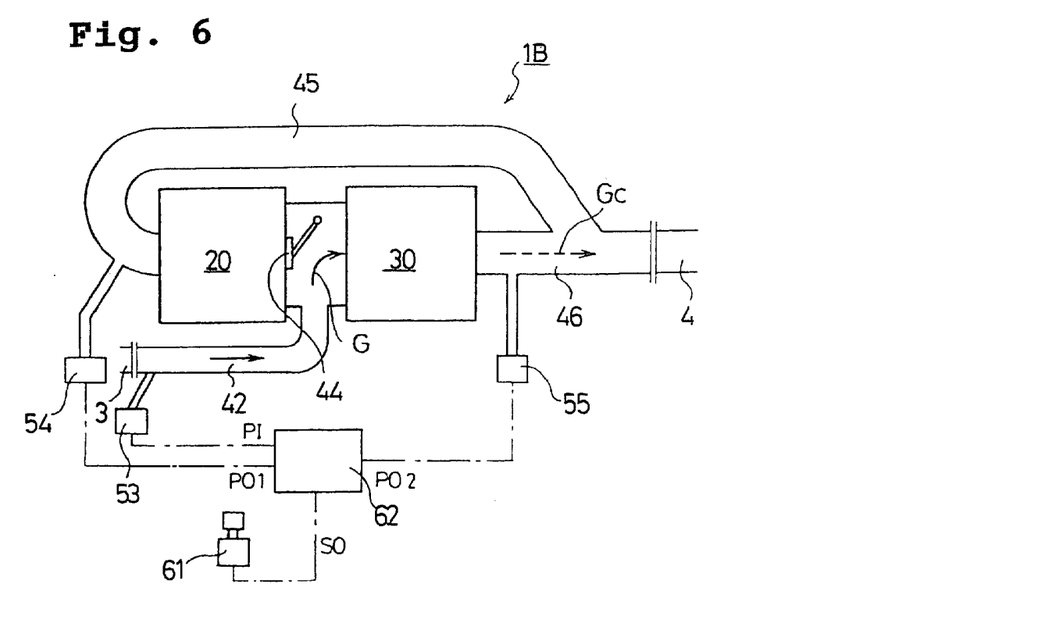
FIG. 6 is a schematic view showing a stream of exhaust gas within the diesel particulate filtering device of the second embodiment, the view showing that a second diesel particulate filter unit is trapping PM.

Moreover, the exhaust gas G flow into a switching passage 43 provided between the first diesel particulate filter unit 20 and the second diesel particulate filter unit 30 by way of an exhaust gas passage 42 provided on a shoulder of the first diesel particulate filter unit 20 from an exhaust gas passage 41 of the inlet side to be connected to the exhaust pipe 3 as shown in FIG. 3. Moreover, the passage of the exhaust gas G is switched by a switching valve 44 provided on this switching passage 43, and the exhaust gas G flows into either of the first diesel particulate filter unit 20 or the second diesel particulate filter unit 30 as shown in FIG. 5 or FIG. 6.

The filter body 21 of this first diesel particulate filter unit 20 is formed into a hollow cylinder. An end 21a of the inlet side of this hollow cylinder is closed. The outside passage 22 which is the inflow-side passage for the exhaust gas G is formed between a case 2 and the outer peripheral surface of this filter body 21. A hollow portion 23 of the hollow cylinder forms an inside passage 23 which is the outlet-side passage for the exhaust gas Gc cleaned by the filter body 21. The outlet side of the filter body 21 is closed with exception of the inside passage 23 of the hollow portion.

According to this constitution, the exhaust gas G would pass through within a filter 21 from the outside passage 22 to flow out to the inside passage 23. As a result, PM is trapped when passing through within the filter 21.

Moreover, the filter body 21 is provided with a heater for heating PM. This heater is constituted by either (the wire mesh 25 of the outer peripheral surface in FIG. 1) of wire mesh 24 or 25 arranged on the inner peripheral surface and the outer peripheral surface of the filter body 21 and the filter body 21 is heated by feeding a current through this heater 25.

A filter body 31 of the second diesel particulate filter unit 30 also is formed in the same manner as the filter body 21 of the first diesel particulate filter unit 20.

The exhaust gas G passes through the filter body 21 from the outside passage 22 of the filter body 21, when the exhaust gas G passes through the first diesel particulate filter unit 20 as shown in FIG. 5. PM in the exhaust gas G is trapped by this filter body 21, and the exhaust gas become cleaned exhaust gas Gc. After flowing out to the inside passage 2, this cleaned exhaust gas Gc is discharged to the exhaust pipe 4 from an outlet 46 by way of an exhaust gas passage 45 provided on a shoulder of the first diesel particulate filter unit 20 and the second diesel particulate filter unit 30.

Moreover, after the exhaust gas G passes through the filter body 31 from the outside passage 32 of the filter body 31 to flow out to the inside passage 33, the exhaust gas G is discharged to the exhaust pipe 4 from an outlet 46, when the exhaust gas G passes through the second diesel particulate filter unit 30 as shown in FIG. 6.

Moreover, a diesel particulate filter controller 62 for determining a recovery time to output an operating signal for the switching valve 44 is provided. Moreover, an upstream-side (inlet side) exhaust pressure sensor 53 is arranged on the upstream side than the switching valve 44. A first downstream-side (outlet side) exhaust pressure sensor 54 is arranged on the outlet side of the first diesel particulate filter unit 20, and a second downstream-side (outlet side) exhaust pressure sensor 55 is arranged on the outlet side of the second diesel particulate filter unit 30. The detected values PI, PO1 and PO2 of these sensors are input into the diesel particulate filter controller 62.

This diesel particulate filter controller 62 determines that clogging of the filter body 21 of the first diesel particulate filter unit 20 becomes large, so that the treatment for recovery is required when a pressure ratio (=PO1/PI) of the first downstream-side exhaust pressure value PO1 versus the upstream-side exhaust pressure value PI becomes larger than a first determination value R1 set in advance. An operating signal SC switching the switching valve 44 so as to feed the exhaust gas G to the side of the second diesel particulate filter unit 30 is output based on this determination.

While operating as described above, heating is performed by feeding a current I1 through the heater 25 of the first diesel particulate filter unit 20, and PM trapped in the filter body 21 is burnt by this heating, thereby to be recovered.

Moreover, subsequently, this diesel particulate filter controller 62 determines that clogging of the filter body 31 of the second diesel particulate filter unit 30 becomes large, so that the treatment for recovery is required, when a pressure ratio (=PO2/PI) of the second downstream-side exhaust pressure value PO2 versus the upstream-side exhaust pressure value PI becomes larger than a second determination value R2 set in advance. An operating signal SC switching the switching valve 44 so as to feed the exhaust gas G to the side of the first diesel particulate filter unit 20 is output based on this determination. While operating as described above, heating is performed by feeding a current I2 through the heater 35 of the second diesel particulate filter unit 30, and PM trapped in the filter body 31 is burnt by this heating, thereby to be recovered.

While continuously passing the exhaust gas G to the first diesel particulate filter unit 20 and the second diesel particulate filter unit 30 alternately by repeating these control by means of the diesel particulate filter controller 62, on the one hand, PM is trapped, and on the other hand, recovery is performed, thereby the exhaust gas G to be cleaned.

Furthermore, in the invention, the diesel particulate filter controller 62 is provided with a reset button 61 capable of generating external signals SO, whereby a determination-value update means 62a of the diesel particulate filter controller 62 is arranged to be able to start by the external signals SO of the reset button 61.

Secondly, this determination-value update means 62a will be described. This determination-value update means 62a is means for setting and changing determination values R1 and R2 for determining the recovery time of operation for switching the switching valve 44 using the diesel particulate filter controller 62 in order to recovery the filter bodies 21 and 31. This "determination-value update means" 62a is constituted by the "program for changing a determination value" of which flowchart is illustrated in FIG. 4, which is invoked from main control program of the diesel particulate filter controller 62 when inputting the external signals SO of the reset button 61.

When the determination values R1 and R2 are set at mounting the diesel particulate filtering device 1B on the vehicle and when a mechanic and other of the vehicle judges that changes in output of the exhaust pressure sensors 53, 54 and 55 due to time aging have become large, the mechanic and other pushes the reset button 61, thereby this determination-value update means 62a to be started.

Figure 4:
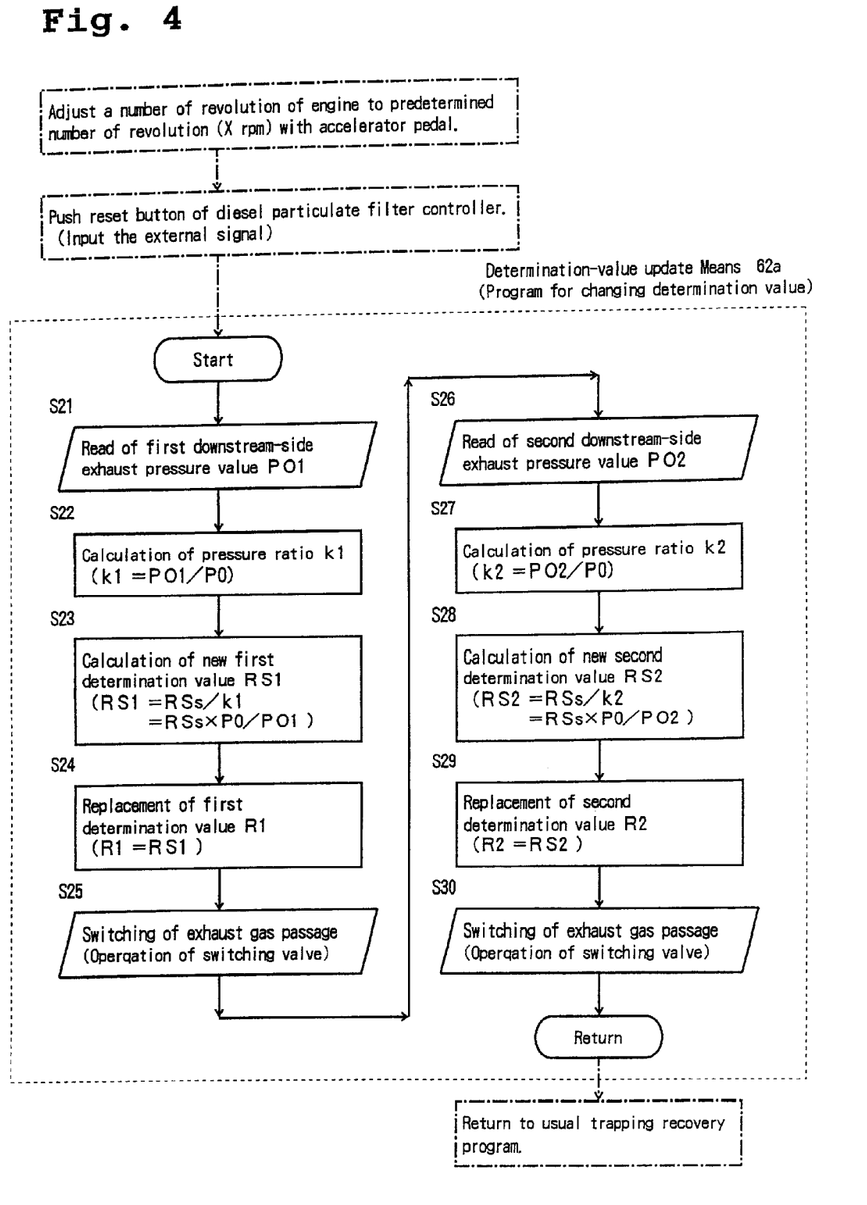
FIG. 4 is a flowchart of the "program for changing a determination value" of a determination-value update means of the diesel particulate filtering device of the second embodiment.

Namely, first, the mechanic and other operates an accelerator to adjust a number of revolution of the engine to a predetermined number of revolution X rpm (for example, a speed of revolution generating a maximum output: the reason is that the maximum output is not generated because of idling, but gentle characteristics can be obtained, since engine control systems such as EGR does not function at a maximum output point usually) as shown in FIG. 4. Under this condition, the mechanic and other pushes the reset button 61 of the diesel particulate filter controller 62. According to this operation, the "program for changing the determination value" 62a which is the determination-value update means is started.

The first downstream-side exhaust pressure value PO1 of the diesel particulate filter unit using currently is red at step S21, when this "program for changing the determination value" 60a is started as shown in FIG. 4. Moreover, in this case, it is assumed that PM is trapped by the first diesel particulate filter unit 20 as shown in FIG. 5. As shown in FIG. 6, in the following description, the first diesel particulate filter unit 20 is replace with the second diesel particulate filter unit 30, when PM is trapped by the second diesel particulate filter unit 30 or the like.

Subsequently, a pressure ratio k1 (=PO1/P0) of the first downstream-side exhaust pressure value PO1 of this the first diesel particulate filter unit 20 and the initialized-downstream-side exhaust pressure value P0 is calculated at step S22. At subsequent step S23, a new determination value RS1 (=RSs/k1=RSs×P0/PO1) are calculated from this pressure ratio k1 and the initialized-reference determination value RSs. Subsequently, a first determination value R1 is replaced with a new determination value RS1 at step S24.

Switching of the passage to the first diesel particulate filter unit 20 from the second diesel particulate filter unit 30 is designated to switch the switching valve 44 at step S25. Namely, the condition of FIG. 5 is changed into the condition of FIG. 6.

The second downstream-side exhaust pressure value PO2 of the second diesel particulate filter unit 30 is red at step S26.

A pressure ratio k2 (=PO2/P0) of this red-second downstream-side exhaust pressure value PO2 and the initialized-downstream-side exhaust pressure value P0 is calculated at step S27. At subsequent step S28, a new determination value RS2 (=RSs/k2=RSs×P0/PO2) are calculated from this pressure ratio k2 and the initialized-reference determination value RSs. A second determination value R2 is replaced with a new determination value RS2 at step S29.

Switching of the passage to the second diesel particulate filter unit 30 from the first diesel particulate filter unit 20 is designated to switch the switching valve 44 at step S30. Namely, the condition of FIG. 6 is changed into the condition of FIG. 5.

Subsequently, terminating a series of flow of this "program for changing the determination value" 62a, return instruction is performed to return to an usual diesel-particulate filter running management program and to continue the running.

In the case that the purpose is only starting of this "program for changing a determination value" 62a, the engine is stopped when the determination value change operation is terminated. In the case that there are other operations, the operation is continued without stopping the engine and to stop the engine when the operation is terminated.

Moreover, according to this "program for changing the determination value" 62a, the recovery time of the respective diesel particulate filter units 20 and 30 are determined using the determination value R1 for the first diesel particulate filter unit 20 and the determination value R2 for the second diesel particulate filter unit 30.

However, a mean value (=(RS1+RS2)/2) of the new determination value is taken as the determination value, or the downstream-side exhaust pressure sensor is provided on the position which lies to both downstream side of both diesel particulate filter units 20 and 30 to correct the determination value using the detected value of this downstream-side exhaust pressure sensor and to obtain a new determination value, when the recovery time of both diesel particulate filter units 20 and 30 are determined using one determination value.

According to the diesel particulate filtering device 1B described above, the following effects can be performed.

The fluctuation from the reference value for determination RSs is corrected and the new determination values RS1 and RS2 are stored as the determination values R1 and R2 using the downstream-side standard exhaust pressure value P0 of the diesel particulate filter units 20 and 30 set and stored in the diesel particulate filter controller 62 in advance and the measured values PO1 and PO2 of the exhaust pressure value of the downstream-side, whereby the pressure-ratio determination values R1 and R2 for clogging can be reset simply.

Moreover, the "program for changing the determination value" 62a is started by the external signals SO, whereby the determination values R1 and R2 can be reset at appropriate timing.

Moreover, the embodiments described above are intended to make technical contents of the invention apparent strictly and this invention can not be construed in a narrow sense limiting only to such specified examples, and the invention should be construed broadly as it is apparent that the invention can be practiced in various modification and variation within spirits of the invention and the scope described in claims.

What is claimed is:

1. A diesel particulate filtering device, comprising:
   a diesel particulate filter unit for cleaning exhaust gas of an internal combustion engine, wherein the cleaning of exhaust gas and recovery of the diesel particulate filter unit clogged up through the cleaning of exhaust gas are performed alternately;
   exhaust pressure sensors provided respectively on an upstream side and on a downstream side of the diesel particulate filter unit;
   a diesel particulate filter controller for inputting detected values of the exhaust pressure sensors to determine a recovery time of the diesel particulate filter unit by using the ratio between an upstream-side exhaust pressure value and a downstream-side exhaust pressure value; and
   determination-value update means in which the diesel particulate filter controller compares the detected value of the downstream-side exhaust pressure sensor with a standard exhaust pressure value stored in advance to reset a determination value for determining the recovery time.

2. The diesel particulate filtering device according to claim 1, wherein the determination value to be reset is defined as a value obtained by multiplying a standard determination value by the standard exhaust pressure value at the downstream side and dividing by the exhaust pressure value at the downstream side.

3. The diesel particulate filtering device according to claim 1, wherein said determination-value update means is activated by an external signal.

4. A diesel particulate filtering device, comprising:

an inflow passage;

a plurality of diesel particulate filter units for cleaning exhaust gas of an internal combustion engine, wherein cleaning of the exhaust gas and recovery of the diesel particulate filter units clogged up through the cleaning of the exhaust gas are performed alternately while switching the inflow passage of the exhaust gas to the diesel particulate filter units;

exhaust pressure sensors provided respectively on an upstream side and on a downstream side of the diesel particulate filter units;

a diesel particulate filter controller for inputting detected values of the exhaust pressure sensors to determine a recovery time of the diesel particulate filter units by using the pressure ratio between an upstream-side exhaust pressure value and a downstream-side exhaust pressure value, and for controlling by switching the inflow passage of the exhaust gas to the diesel particulate filter units; and determination-value update means in which the diesel particulate filter controller compares the detected value of the downstream exhaust pressure sensor with a standard exhaust pressure value stored in advance to reset a determination value for determining the recovery time.

5. The diesel particulate filtering device according to claim 4, wherein the determination value to be reset is defined as a value obtained by multiplying a standard determination value by the standard exhaust pressure value at the downstream side and dividing by the exhaust pressure value at the downstream side.

6. A diesel particulate filtering device, comprising:

a diesel particulate filter unit to clean exhaust gas passing therethrough;

pressure sensors on an upstream side and on a downstream side of the diesel particulate filter unit to detect an upstream exhaust pressure and a downstream exhaust pressure of the gas;

a diesel particulate filter controller to determine a recovery time of the diesel particulate filter unit by comparing a determination value and the pressure ratio between an upstream exhaust pressure value and a downstream exhaust pressure value; and a determination value reset unit to reset a determination value used to determine the recovery time.

7. The device according to claim 6, further comprising an engine, wherein the engine is accelerated to a revolution speed to generate a maximum output to reset the determination value.

* * * * *